Inventor:
Helmut Benteler,
by: Attorney though small, are sufficient to enable the raw tube to be drawn at a sufficient reduction rate in one operation to the required small dimensions, without any damage to the copper coating.

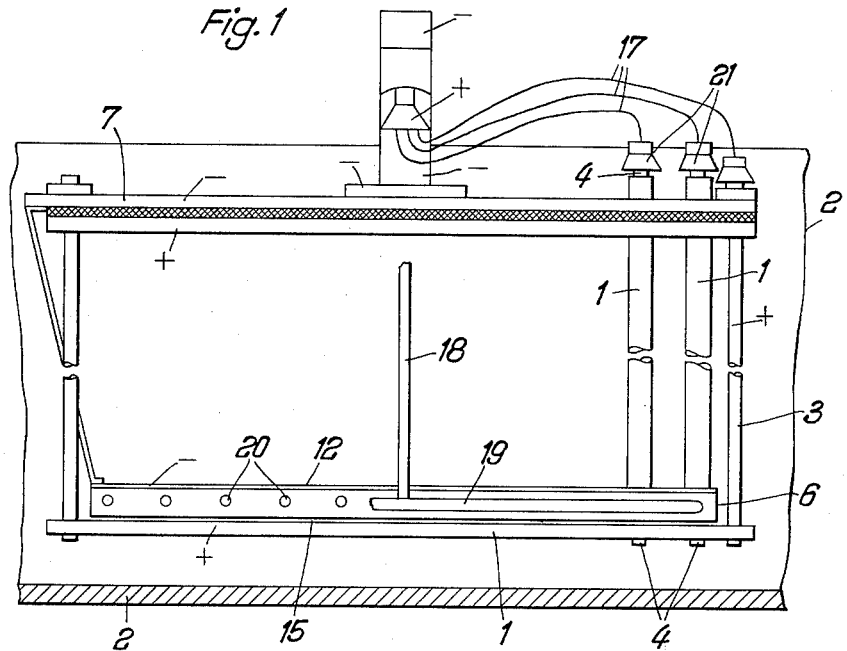
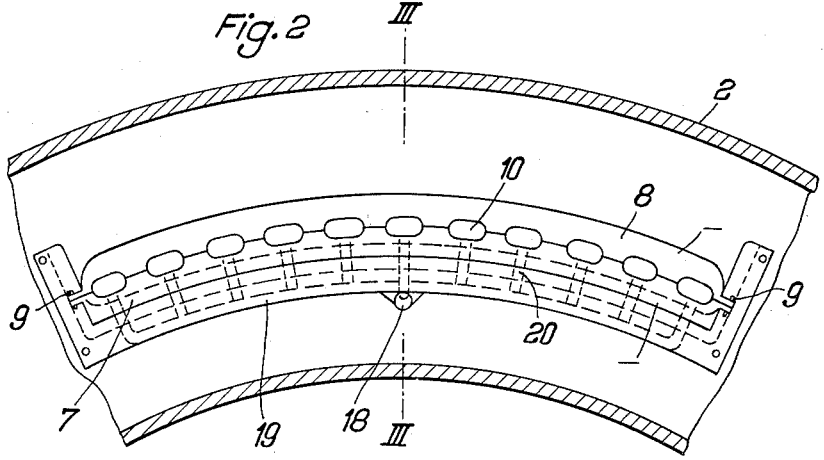

2,978,799
INTERNALLY AND EXTERNALLY COPPER-COATED STEEL TUBES AND THEIR MANUFACTURE

Helmut Benteler, Bielefeld, Germany, assignor to Benteler-Werke Aktiengesellschaft Werk Neuhaus, Neuhaus, Kreis Paderborn, Germany Filed May 16, 1955, Ser. No. 508,731

Claims priority, application Germany May 19, 1954

5 Claims. (Cl. 29—183.5)

The invention relates to the production of steel tubing of very small internal diameter (e.g. 2 mms.) and in great lengths of about 15 mtrs., provided internally and externally with a thin, smooth, corrosion-proof coating of copper or copper alloys.

Tubing of this kind is used particularly for lubricating systems, as conduits for brake fluids, for hydraulic brakes of vehicles, and also as fuel conduits in vehicles or for conducting the refrigerant in refrigerating plants. Tubes for the purposes mentioned, the wall thickness of which is often less than 1 mm. (e.g. 0.5 mm.), frequently have an internal diameter down to about 1.2 mms. It is important that these tubes can be made as long as possible because in installing such conduits, for example, in motor vehicles, it is necessary to avoid joints which are very difficult to make in the case of conduits with such small dimensions. Another requirement for such conduits is that, particularly when they are used for conduits of vehicles, they possess sufficient vibration strength.

It is known to employ for the above mentioned purposes solid copper conduits; the manufacture of these is, however, complicated and they are expensive and moreover are not sufficiently proof against fatigue fracture.

Consequently it has already been endeavoured to substitute for the solid copper conduits, steel tubes which are provided internally and externally with a galvanic coating of copper or the like. It has, however, been found impossible to coat with copper the inner wall of tubes having the above mentioned small internal diameters and of the great lengths which are necessary. Even in the case of tubes having a relatively large internal diameter as compared with the dimensions mentioned and produce in correspondingly shorter lengths, it is not possible with the known means to feed into the interior of the tubes midway the length thereof the amount of current necessary for extracting a sufficient quantity of copper from the electrolyte, as the potential drop of the inner anodes, required for this purpose, is too great in the case of the necessarily small cross-sections. Moreover, the annular cross-section remaining between the anode and the tube is not sufficient to prevent an impoverishment of the copper ions even with a continuous circulation of electrolyte, with the result that in the middle section of the tube length no or only a porous and insufficiently thick copper coating is deposited.

Even the use of a dipping process employing copper sulphate salts has been found impracticable because it is not possible with the great lengths of tubing having a small internal diameter to obtain in the interior of the tube a uniform, nonporous copper coating of sufficient thickness and because the copper deposit obtained in this manner does not adhere sufficiently firmly to the outer and inner surfaces of the tube.

As a consequence, it was found necessary to change the system of production and to produce tubing for the purposes in question by first rolling a strip of band material to the necessary well thickness and then, after galvanic coppering on both sides, winding the strip into a tube with the desired dimensions. Before winding into a tube, however, the copper coated thin band is provided on one side with a thin tin foil as solder, which melts under heat and compactly unites the surface areas superposed during the winding operation. This process generally used today in the production of tubes of the described type is however very complicated and expensive, and additionally the lubricant and fuel conduits produced in this manner have a limited fatigue strength and are sensitive to corrosion, especially at the seams.

The invention has for its object to produce for the purpose in question an easily bendable tube with extremely high fatigue resistance, provided internally and externally with a sufficiently thick, corrosion-resisting coating of copper or copper alloy, which tube, while having a very small internal diameter, can be made in very great lengths, and by a process which can be carried out more simply and economically than that producing the known tubes.

In order to solve this problem, the following process is proposed according to the invention:

A raw tube produced according to known processes in a length corresponding to only a small fraction of the desired length of the finished tube but with a correspondingly larger diameter, is placed in an electrolytic bath and provided simultaneously with an internal and external coating having a thickness of about $20\mu$ to $50\mu$; the raw tube provided with such galvanic coating is annealed in an atmosphere free from oxygen at a temperature slightly below the melting point of the galvanic coating; and, after annealing, the tube is cold drawn to the desired dimensions for the finished tube, reducing the thickness of the wall and of the coating in so doing.

Hot rolled seamless tubes are preferably used as raw tubes and can have an internal diameter of about 10 to 30 mms. and a length of 2 to 6 metres. However, raw tubes with the desired dimensions produced by any other known process can also be used.

The invention is based on recognition of the fact that, when using raw tubes having the above-mentioned dimensions, it is possible by the means indicated to cause an absolutely uniform, non-porous metal coating to deposit on the inner and outer sides of the tube in a particularly economical manner. It has been found that the cooper coating to be applied to the raw tube should not be made too thick because the subsequent cold working can easily displace and peel off the coating in passing through the die plate, for example over a drawing mandrel. On the other hand, taking into consideration the desired small final dimensions of the finished tube, the copper coating applied on the raw tube should not be chosen too thin, in order to ensure a sufficiently thick, corrosion-proof coating on the finished tube. Both the limits mentioned above are additionally influenced by the question of economical production of the raw tube.

The invention is also based on recognition of the fact that the above mentioned conditions for the economical production of the tubes can only be complied with if the raw tubes, after the application of the copper coating, are annealed at a temperature slightly below the melting point of the metal coating in an atmosphere free from oxygen, because only in this manner will the firm adhesion between the copper coating and the surface of the tube, necessary for the subsequent cold drawing process, be attained, which makes it possible to reduce the copper coating applied in a thickness of about 20 to $50\mu$ to a thickness of about $10\mu$ in the finished tube, without the density and uniformity of the copper coating being detrimentally affected thereby.

An embodiment of the invention is illustrated by way of example in the accompanying drawing, in which:

Figs. 1 and 2 show a segment-shaped portion of an annular galvanic bath in longitudinal section and top plan view respectively;

Hot drawn seamless steel tubes produced according to known processes and which may be, for example, 3 metres in length and have an inner diameter of about 10 to 30 mms. and a wall thickness of 2.5 mms. are used as raw tubes. These raw tubes are first cleaned and degreased so that they have a clean metallic surface inside and outside. The raw tubes 1 thus prepared are then introduced into the annular galvanizing bath 2 illustrated in Figs. 1 to 4, which contains the copper electrolyte and in which a carrier frame 3 is arranged for taking a relatively large number of raw tubes 1.

Figure 3:
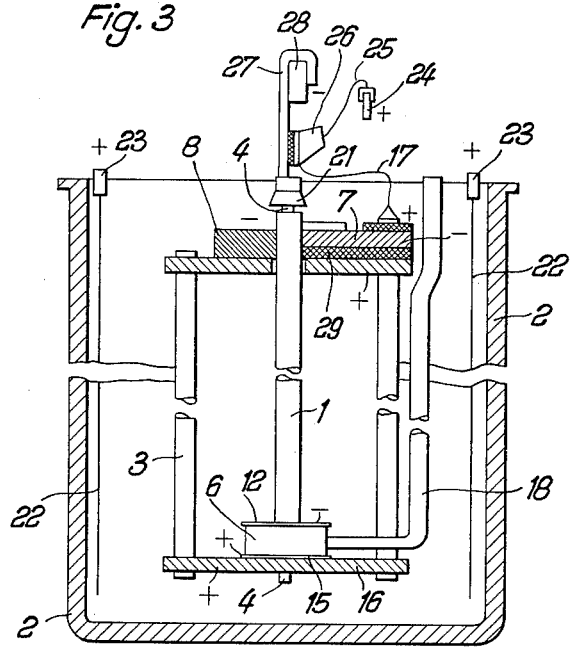
Fig. 3 is a section of the annular bath taken on line III—III of Fig. 2.
Figure 4:
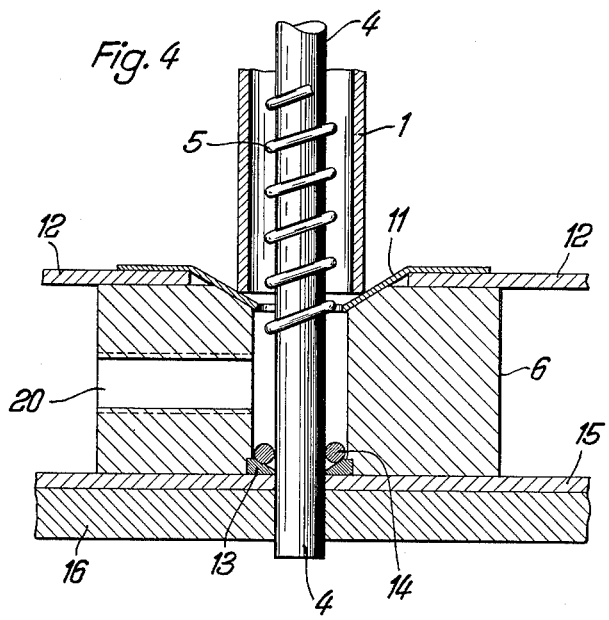
Fig. 4 is a cross-section through the lower contact body on an enlarged scale.

Before clamping the raw tubes 1 in position an anode 4, consisting of a straight stretched copper wire, is inserted into each of the tubes, the anode being surrounded by a spiral 5 of rubber or plastic material preventing the anode from coming into contact with the inner wall of the tube (Fig. 4). In the case of a tube with the internal diameter above indicated, the anode will be 8 mms. in diameter. The raw tube 1 is inserted together with the anode 4 and plastic spiral 5 so that its lower end is located in contact body 6. Then the upper end of the raw tube 1 is gripped between clamping members 7 and 8 held together by two wing screws 9 and constituting a contact bar. The clamping members 7 and 8 are provided with ellipitical recesses 10 for receiving the raw tubes 1, so that raw tubes with different external diameters can be used.

To enable tubes 1 of different diameters to be gripped, the contact body 6, made of insulating material, is provided at its upper surface with an annular resilient contact plate 11 sloping conically inwards and downwards towards the middle, which plate is conductively connected to a contact rail 12 connected up in the cathode circuit.

The anode current is fed to the copper wire anode 4 over the contact disk 13, also of conical construction, inserted in a chamber-like enlargement in the lower end of the bore in the contact body 6 and on which the anode 4 is supported by means of a clamped-on contact ring 14. The contact disk 13 bears tightly against continuous circular anode bar 15 arranged in the annular bath 2 and resting on the bottom 16 of the carrier frame 3. Anode current is fed to the upper end of the anode 4 by a cable 17.

The upper contact-making for the raw tube 1 is effected by the clamping members 7, 8 of the contact bar, against the recesses 10 of which the tube wall bears.

In order to continually flush the inner anode 4 with copper electrolyte during the galvanizing process, the copper electrolyte is introduced into the feed pipe 18 through a distributor and after flowing through the branch pipe 19 and bores 20 of the contact body 6, enters the raw tube 1 from below and rises therein between the inner wall of the tube and the anode 4. To prevent the copper electrolyte from splashing up at the upper end of the tube 1, a cap 21, widening in cone-shape in downward direction, is fitted with the cable 17 over the tube outlet, which cap deflects the liquid electrolyte downwards and returns it into the bath around the periphery of the tube.

For coppering the outer surface of the raw tube 1, copper plates 22 connected to the anode current are arranged in the galvanizing bath 2 spaced from the inner wall thereof, which plates bear against the anode bar 23 which is fixed on the wall of the bath vessel.

The anode current for the internal coppering of the raw tube 1 flows from the bus bar 24 along a cable 25 to the current distributor 26 which is mounted on a suspension hook 27 connected to the cathode current. From here the anode current continues its flow along the cable 17 to the upper end of the inner anode 4 and over the carrier frame 3 and the anode bar 15, bearing against the bottom member 16 of the carrier frame 3, whence it passes on to the lower end of the anode 4 through the ring 14. The cathode current is conducted from the bus bar 28 over the suspension hook 27 to the clamping member 7 of the upper contact bar separated from the carrier frame 3 by an insulating layer 29.

Figure 5:
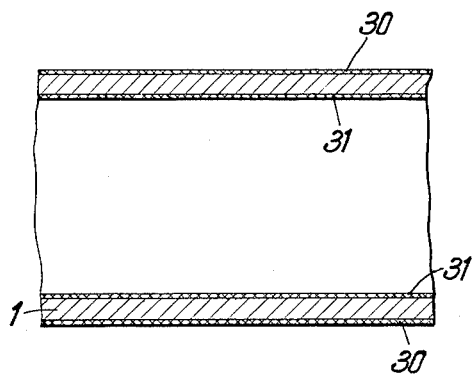
Fig. 5 is a longitudinal section on an enlarged scale showing a portion of a raw tube provided with an internal and an external copper coating.
Figure 6:
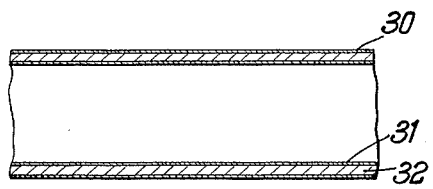
Fig. 6 is a longitudinal section on an enlarged scale showing a portion of a finished tube.

On leaving the galvanizing bath, the raw tubes have along their entire length both inside and outside a uniform, dense copper coating, for example, $30\mu$ in thickness, as shown diagrammatically in Fig. 5. Thereafter the tubes are annealed in a continuous heating furnace with exclusion of oxygen, for example in a protective gas atmosphere composed of nitrogen, at a temperature of about 900° to 950° C. (the melting point of pure copper is 1083°) and are then cold drawn in stages in a continuous operation on one or more draw benches to the desired dimensions for the finished tube, thereby simultaneously reducing the thickness of the wall and the coating (as can be seen from Fig. 6). Between the individual drawing passes and at the end of the cold drawing process the tubes are subjected to a further annealing treatment.

The following scheme may serve as an example to show such cold drawing treatment of a raw tube 3 metres in length and with an internal diameter of 20 mms.

The internally and externally copper-coated raw tube 3 metres in length, with a wall thickness of 2.5 mms. and an internal diameter of 20 mms., is, after being annealed, drawn over a mandrel rod through a die plate in such a manner that a tube about 6 mtrs. in length with a wall thickness of 1.8 mms. and an internal diameter of about 14 mms. is produced. Thereupon the tube is again cold drawn over a mandrel rod through a die plate to a length of 11.2 mtrs., the wall thickness being thereby reduced to 1.2 mms. and the internal diameter to 12.5 mms. The tube is then annealed at a temperature of about 950° C. in a protective gas atmosphere. Thereafter the tube is again cold drawn in two successive passes over a short mandrel through a draw plate, whereby it will be lengthened in the first pass to 17.8 mtrs. and in the second pass to 23.3 mtrs., its wall thickness being reduced to 0.7 mms. and its internal diameter to 8.5 mms. Then the tube is once more subjected to an annealing treatment at about 950° C. in a protective gas atmosphere. The thickness of the copper coating which was $30\mu$ on the raw tube, is now about $12\mu$ and the coating is uniform both on the inner wall and the outer wall of the tube.

The tube is subsequently cold drawn through a die plate without using a mandrel, whereby the wall thickness of the steel tube is not further reduced but even increases by a fraction of a millimetre.

During the first hollow pass (without internal tool or mandrel) the internal diameter of the tube is reduced to about 6.5 mms. and its length increased to 30 mtrs. After four additional hollow passes the tube has then attained a length of about 86 mtrs. the internal diameter being only 1.5 mms. with a wall thickness of about 0.7 mms. The copper coatings in the finished tube have a thickness of about $10\mu$.

In this manner the tube can be further reduced in diameter but this is not necessary in most cases for the purposes for which the tube is intended and which are set forth in the introduction to this specification. When the cold drawing process has been concluded, the finished tube 32 may again be annealed in a protective gas atmosphere at a temperature of about 920° and 950° C.

The finished tubes made in lengths of, for example, 80 to 100 metres, can be cut into sections or any suitable length.

Instead of the raw tubes being 3 metres in length, they might be, for example, 6 metres long, in which case it is advisable to use inner anodes made of wire which are thicker in the middle than at the ends so as to compensate by this means the drop in potential in the anode current towards the middle of the tube by reducing the space between the periphery of the anode and the inner wall of the tube.

Though specific embodiments of my invention have been shown and described in detail, to illustrate the application of the principles of my invention it will be understood that the same may be otherwise embodied without departing from such principles and without avoiding the scope of the appended claims.

What I claim as my invention is:

1. The method of producing seamless steel pipes of great length and small inner diameter having an internal and an external protective metallic coating of copper or the like, comprising the steps of placing a seamless raw or stock steel pipe having a length of not more than about 6 meters and an inner diameter of not less than about 10 millimeters, and being adapted to be cold drawn, in an electrolyte solution and inserting said stock pipe into the cathode current of an electric source; introducing an at least substantially straight wire or rod having at least the length of the stock pipe coaxially thereinto and inserting said wire into the anode current of said electric source; electroplating said stock pipe internally and externally with a metallic coating of copper or the like having a thickness of about $20\mu$ to $50\mu$; maintaining the electrolyte solution in flowing motion through said stock pipe during said electroplating thereof; annealing the thus electroplated stock pipe in a nonoxidizing medium at a temperature slightly below the melting point of the coating metal; and thereafter cold drawing the same in at least one step into the finished pipe having a length of at least about 15 meters, an inner diameter not exceeding about 15 millimeters and an internal and external protective coating each of customary thickness.

2. The method defined in claim 1 wherein the coated raw or stock steel pipe is reannealed between succeeding cold drawing steps in a nonoxidizing medium at a temperature slightly below the melting point of the coating metal.

3. The method of producing a seamless steel tube provided with an internal and an external metallic coating of copper or the like for use as conduit for lubricants, brake fluids, liquid fuel and the like particularly in vehicles and in machinery, comprising the steps of electroplating a seamless raw or stock steel pipe having a length of less than about six meters and an inner diameter of more than about 10 millimeters with a metallic coating having a thickness of about $20\mu$ to $50\mu$; annealing the thus electroplated stock pipe in a nonoxidizing medium at a temperature slightly below the melting point of the coating metal; and thereafter cold drawing the coated stock pipe in a plurality of steps to a length of up to about 100 meters while reducing the inner diameter to below about 15 millimeters, the initial drawing steps being performed in a die plate with mandrel and the final drawing steps in a die plate alone.

4. The method defined in claim 3 wherein the coated raw or stock steel pipe is reannealed between succeeding cold drawing steps in a nonoxidizing medium at a temperature slightly below the melting point of the coating metal.

5. As an article of manufacture a seamless steel pipe for use as a conduit for lubricants, brake fluid, liquid fuel or the like particularly in vehicles and in machinery, such pipe being internally and externally electroplated with a coating of copper or the like and being cold drawn to a length of about 15 to 100 meters, an inner diameter of less than 15 millimeters and a wall thickness of between about 0.7 and one millimeter, said coating having a thickness of about $10\mu$.

References Cited in the file of this patent

UNITED STATES PATENTS

| | | |
|---|---|---|
| 399,245 | Converse | Mar. 12, 1889 |
| 674,394 | Beck et al. | May 21, 1901 |
| 1,072,478 | Lutz | Sept. 9, 1913 |
| 1,759,171 | Soderberg | May 20, 1930 |
| 1,886,218 | Olin et al. | Nov. 1, 1932 |
| 2,005,306 | Wallis | June 18, 1935 |
| 2,110,965 | Singer | Mar. 15, 1938 |
| 2,187,595 | Wean | Jan. 16, 1940 |
| 2,267,219 | Renkin | Dec. 23, 1941 |
| 2,270,398 | Westin | Jan. 20, 1942 |
| 2,307,243 | Slagle | Jan. 5, 1943 |
| 2,406,956 | Matthews | Sept. 3, 1946 |
| 2,428,474 | Snively | Oct. 7, 1947 |
| 2,706,175 | Licharz | Apr. 12, 1955 |

FOREIGN PATENTS

| | | |
|---|---|---|
| 2,764 | Great Britain | 1859 |
| 342,648 | Great Britain | Jan. 26, 1931 |
| 521,446 | Germany | Mar. 23, 1931 |